(12) United States Patent
Chen

(10) Patent No.: US 9,199,758 B1
(45) Date of Patent: Dec. 1, 2015

(54) AUTOMATIC LABEL STRIPPING MACHINE

(71) Applicant: Hsiu-Man Yu Chen, Taichung (TW)

(72) Inventor: Hsiu-Man Yu Chen, Taichung (TW)

( * ) Notice: Subject to any disclaimer, the term of this patent is extended or adjusted under 35 U.S.C. 154(b) by 0 days.

(21) Appl. No.: 14/288,832

(22) Filed: May 28, 2014

(51) Int. Cl.
*B32B 38/10* (2006.01)
*B65C 9/40* (2006.01)
*B65C 9/00* (2006.01)
*B32B 43/00* (2006.01)

(52) U.S. Cl.
CPC ............... *B65C 9/40* (2013.01); *B65C 9/0006* (2013.01); *B32B 38/10* (2013.01); *B32B 43/006* (2013.01); *Y10T 156/1168* (2015.01); *Y10T 156/1174* (2015.01); *Y10T 156/1195* (2015.01); *Y10T 156/195* (2015.01); *Y10T 156/1978* (2015.01); *Y10T 156/1994* (2015.01)

(58) Field of Classification Search
CPC .. B32B 38/10; B32B 43/006; Y10T 156/195; Y10T 156/1978; Y10T 156/1994; Y10T 156/1168; Y10T 156/1174; Y10T 156/1195

USPC .................. 156/714, 715, 719, 764, 759, 767
See application file for complete search history.

(56) References Cited

U.S. PATENT DOCUMENTS

| 4,853,074 | A | * | 8/1989 | Manusch et al. | 156/577 |
| 5,370,754 | A | * | 12/1994 | Soloman | 156/64 |
| 6,527,026 | B1 | * | 3/2003 | Huggins | 156/387 |
| 9,033,020 | B2 | * | 5/2015 | Matsumoto et al. | 156/764 |
| 2003/0071051 | A1 | * | 4/2003 | Martinsen | 221/70 |
| 2006/0027333 | A1 | * | 2/2006 | Takami et al. | 156/584 |
| 2008/0302488 | A1 | * | 12/2008 | Liang | 156/584 |
| 2014/0060752 | A1 | * | 3/2014 | Li et al. | 156/767 |

* cited by examiner

*Primary Examiner* — Mark A Osele
*Assistant Examiner* — Nickolas Harm
(74) *Attorney, Agent, or Firm* — Ming Chow; Sinorica, LLC

(57) ABSTRACT

An automatic label stripping machine includes a base, a reel shaft rod, a label stripping unit, a control unit and a sensing unit. Labels can easily be stripped for use and a label reel can conveniently be assembled, replaced and reclaimed by means of the control unit and the sensing unit. In addition, the members of the automatic label stripping machine of this invention can be replaced and repaired conveniently.

9 Claims, 6 Drawing Sheets

AUTOMATIC LABEL STRIPPING MACHINE

BACKGROUND OF THE INVENTION

1. Field of the Invention

This invention relates to an automatic label stripping machine.

2. Description of the Prior Art

A conventional label stripping apparatus includes a housing, a reel support frame and a label stripping unit. The reel support frame is assembled in the interior of the housing for a label tape reel to be fitted thereon. The label stripping unit set at a front side of the housing contains a plurality of rods for a label tape on the label tape reel to be properly inserted thereon for facilitating stripping of labels of the label tape.

The reel support frame and a label stripping unit of the conventional label stripping apparatus are together assembled in the housing so it is quite inconvenient to repair the label reel and the label stripping apparatus. Further, since the reel support frame and the label stripping unit respectively have only one specification; therefore, a user cannot personally select and employ a label reel and label of a suitable length and size according to practical need. Furthermore, in a using or a winding process, the label tape on the label tape reel is apt to become slack and needs to be reset and repositioned. Thus, the conventional label stripping apparatus is very inconvenient to be employed and necessary to be ameliorated.

SUMMARY OF THE INVENTION

The objective of this invention is to offer an automatic label stripping machine, facilitating a user to get smooth labels for use automatically, quickly and conveniently and enabling a user to install easily label reels and labels of various types and different sizes.

The automatic label stripping machine in the present invention includes a base formed with a bottom plate having one side extending upward to form a side plate, which is perpendicular to the bottom plate. A reel shaft rod is horizontally fixed at one side of the side plate, corresponding to the bottom plate, and fitted thereon with at least one roller that has its outer side mounted with a first stop member. A label stripping unit is horizontally assembled at one side of the side plate, corresponding to the bottom plate, and is composed of a guide plate, a press plate, a guide stem and a winding shaft rod. The guide plate is rectangular, formed with an application portion and having its front end bent and formed with a bending portion with an internal angle less than 90 degrees, with the bending portion inserted out of the side plate. The press plate positioned above the guide plate is rectangular and has its front end bent to form a press portion with an internal angle less than 90 degrees. The press portion of the press plate is formed with a curved front end edge, and the press plate is slanting to a direction of the application portion of the guide plate to enable the press portion to push the application portion. The guide stem is fixed between the guide plate and the reel shaft rod. The reel shaft rod is formed with a main body, a fixing member and a power member, and has a toroidal surface radially recessed with at least two fixing grooves. The fixing members are U-shaped and formed with two fixing rods corresponding to the fixing grooves, and the reel shaft rod is connected with the power member. A control unit is installed at one side of the side plate, opposite to the bottom plate, and is electrically connected with the power member. A sensing unit is set at one side of the side plate, corresponding to the bottom plate, composed of a positioning rod, a positioning frame and a sensor. The positioning rod is fixed with the side plate, having another end connected with the sensor, which is provided in a direction toward the bending portion of the guide plate and electrically connected with the control unit.

To use the automatic label stripping machine of this invention, firstly, have a label reel fitted on the roller and then pull out the label tape and have the label tape passing through the guide stem and through a place between the guide plate and the press plate. Then, the label tape is inserted downward to pass through a space between the guide plate and the control unit and finally fixed on the winding shaft rod. Thus, the sensor can function to automatically detect a location of the bending portion of the guide plate to have the label stripped automatically, and the reel shaft rod can be employed for installing thereon with label reels and labels of various types and different sizes.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
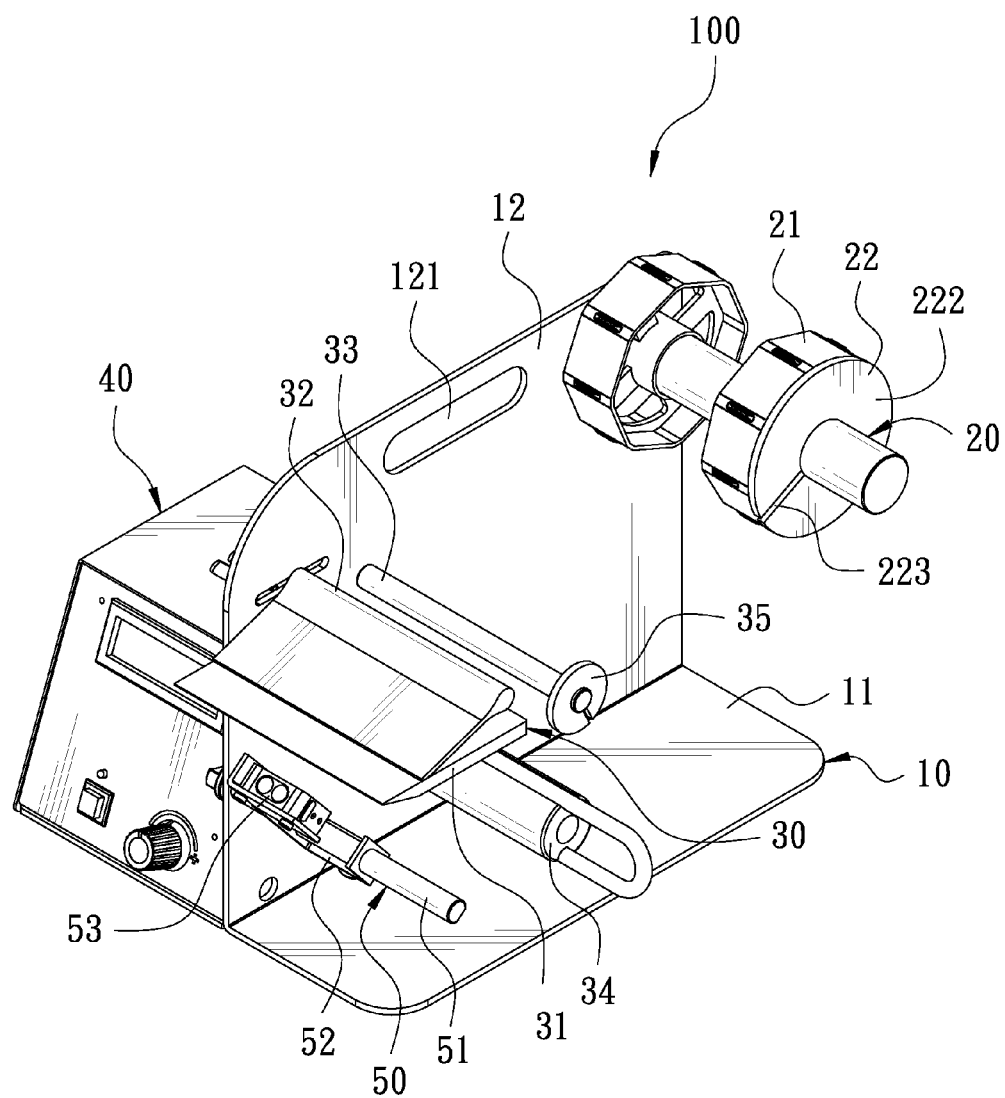
FIG. 1 is a perspective view of an automatic label stripping machine in the present invention.
Figure 2:
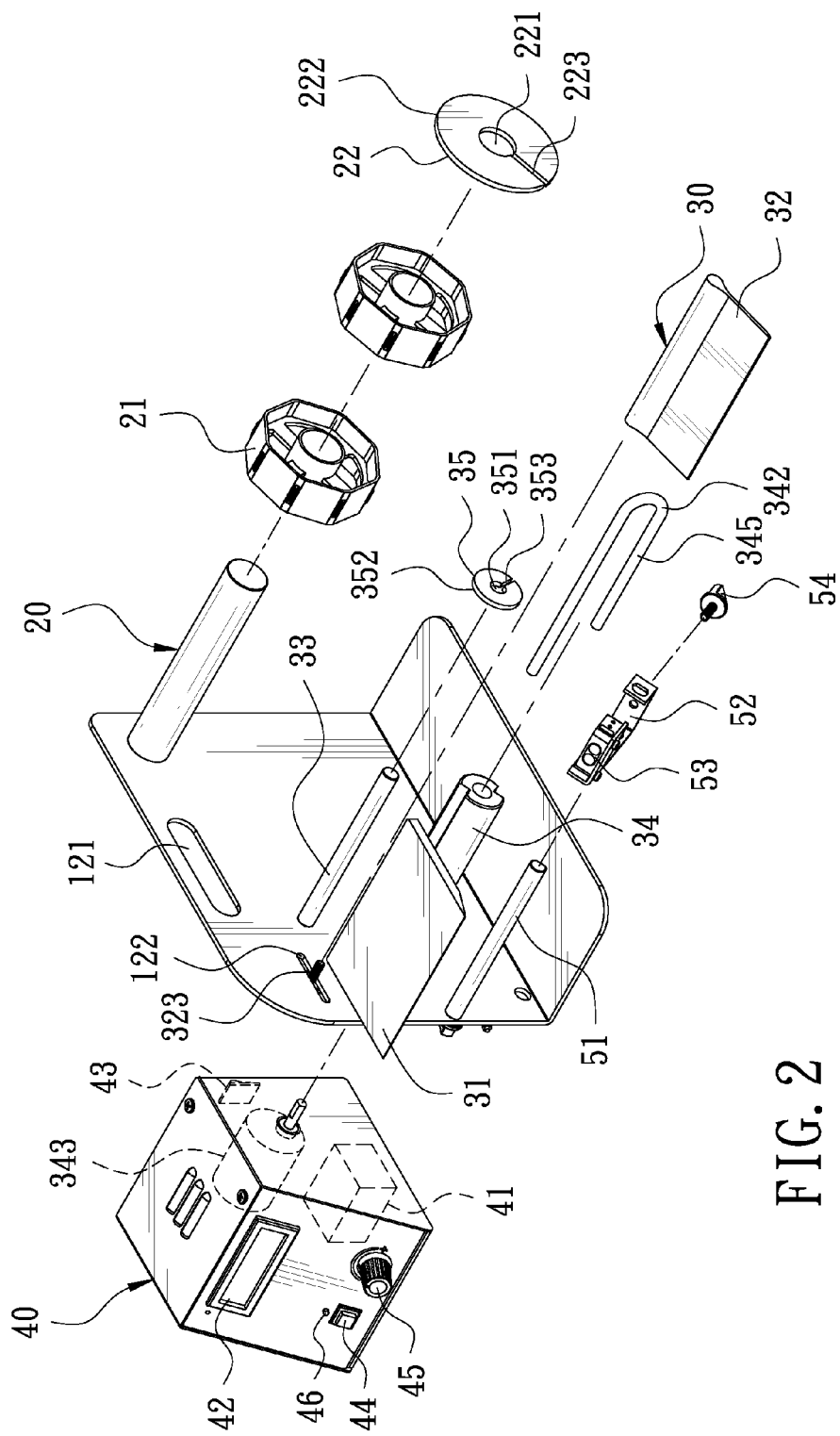
FIG. 2 is an exploded perspective view of the automatic label stripping machine in the present invention.
Figure 3:
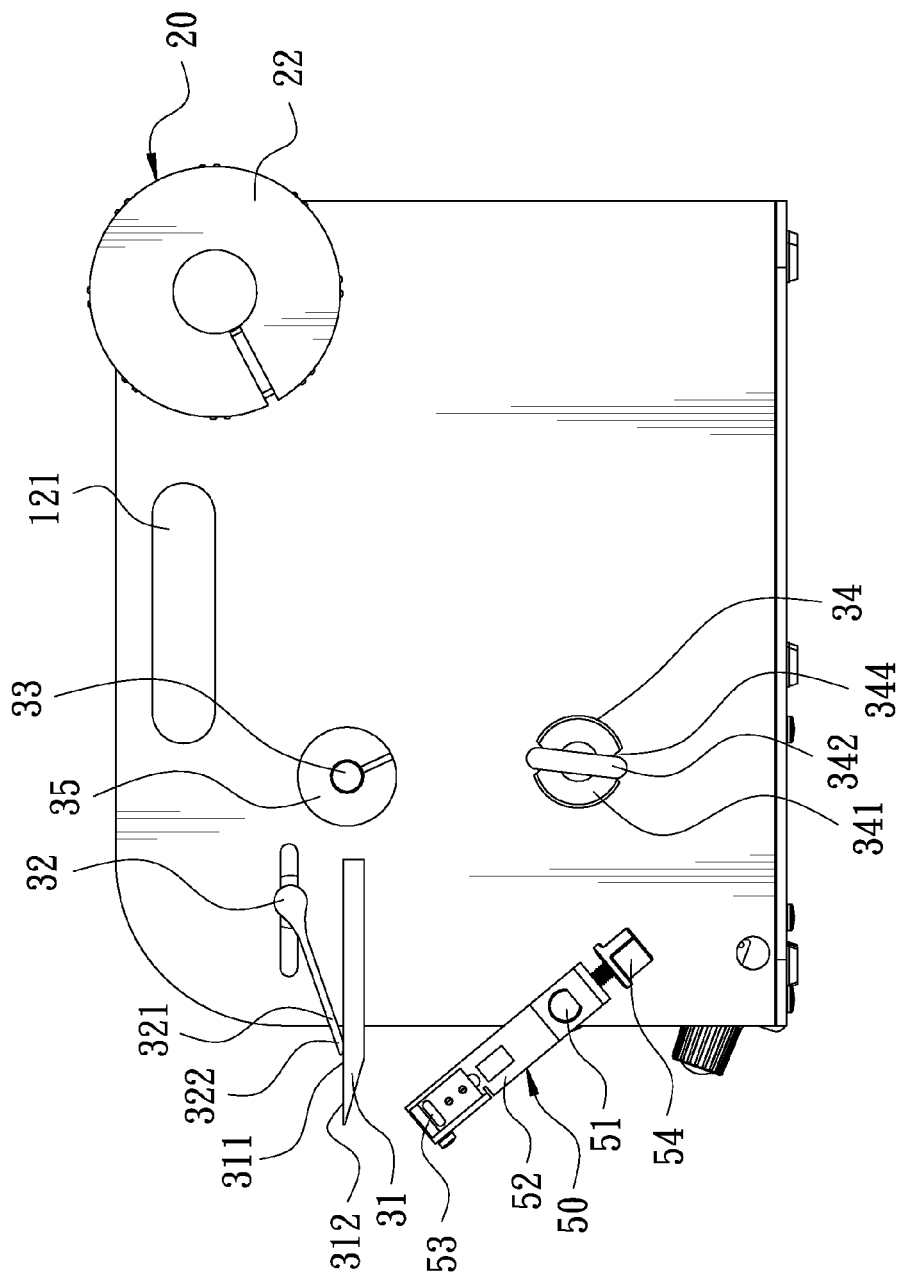
FIG. 3 is a side view of the automatic label stripping machine in the present invention.

A preferred embodiment of an automatic label stripping machine 100 in the present invention, as shown in FIGS. 1-3, includes a base 10, a reel shaft rod 20, a label stripping unit 30, a control unit 40 and a sensing unit 50 as main components combined together.

The base 10 is formed with a bottom plate 11 having one side extending upward to form a side plate 12 that is perpendicular to the bottom plate 11, and the side plate 12 is disposed with a transverse slot 121 and a positioning slot 122, which are parallel to the bottom plate 11.

The reel shaft rod 20 is horizontally fixed at one side of the side plate 12, corresponding to the bottom plate 11, and fitted thereon with at least one roller 21 having its outer side mounted with a first stop member 22, which is bored with an insert hole 221 corresponding with the reel shaft rod 20. The first stop member 22 is radially extended outward to form a protruding ring 222 and cut with a radial insert slot 223 to enable the roller 21 to be restrictedly positioned on the reel shaft rod 20.

The label striping unit 30 is horizontally installed at one side of the side plate 12, corresponding to the bottom plate 11, and is composed of a guide plate 31, a press plate 32, a guide stem 33 and winding shaft rod 34. The guide plate 31 is rectangular, provided with an application portion 311 parallel to the bottom plate 11 and having its front end bent to form a bending portion 312 with an internal angle less than 90 degrees, and the bending portion 312 is inserted out of the side plate 12. The press plate 32 positioned over the guide plate 31 is rectangular, having its front end bent to form a press portion 321 with an internal angle less than 90 degrees, and the press portion 321 is formed with a curved front end edge 322. The press plate 32 is provided slanting toward the application portion 311 of the guide plate 31 to enable the press portion 321 to press the application portion 311, and the press plate 32 has its rear end assembled with the positioning slot 122 of the side plate 12 by a first positioning member 323. The first positioning member 323 is a screw. The guide stem 33 is fixed between the guide plate 31 and the reel shaft rod 20 and fitted thereon with a second stop member 35, which is bored with an insert hole 351 corresponding to the guide stem 33. The second stop member 35 is radially stretched outward to form a protruding ring 352 and cut with a radial insert slot 353. The winding shaft rod 34 is composed of a main body 341, a fixing member 342 and a power member 343. The main body 341 has its torus radially recessed with at least two fixing grooves 344. The fixing member 342 is U-shaped and formed with two fixing rods 345 corresponding to the two fixing grooves 344 and different in length. The power member 343 is a motor connected with the winding shaft rod 34 for driving the winding shaft rod 34 to operate.

Figure 4:
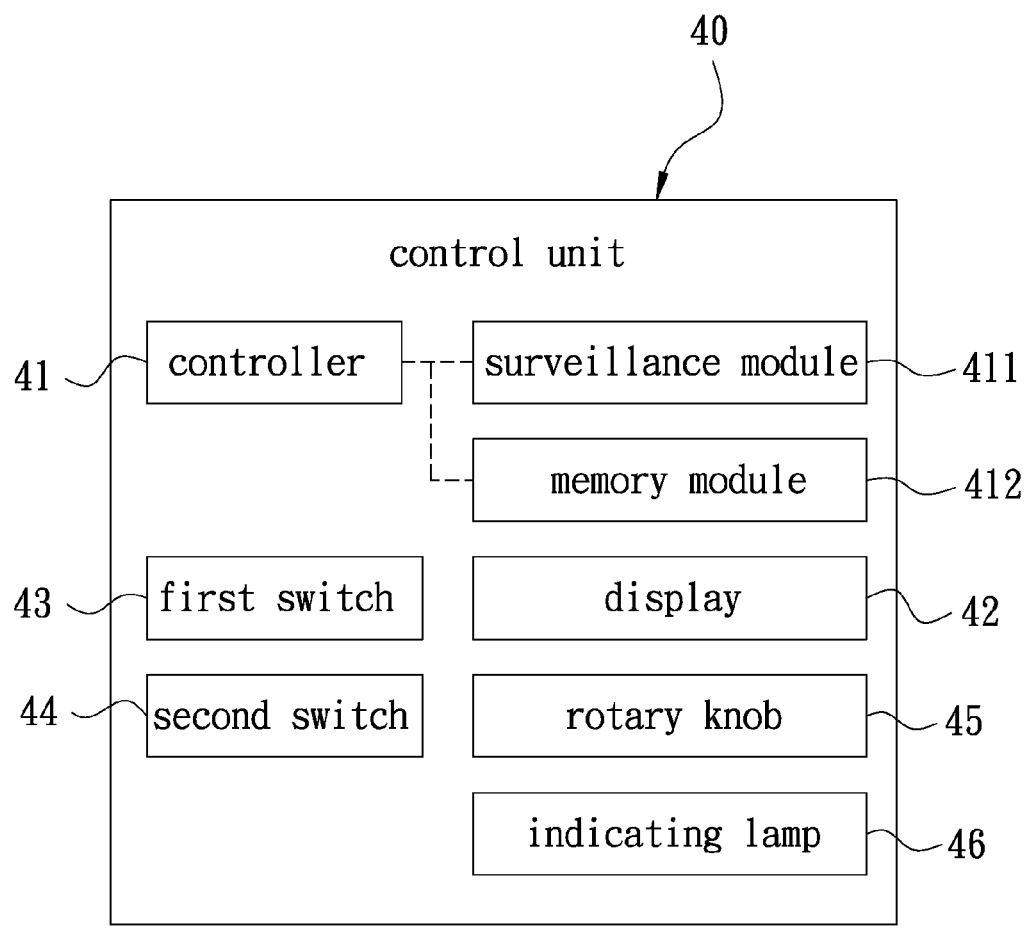
FIG. 4 is a block diagram of a control unit in the present invention.

The control unit 40, referring to FIGS. 2 and 4, is assembled at one side of the side plate 12, opposite to the bottom plate 11, and is electrically connected with the power member 343. The control unit 40 consists of a controller 41, a display 42, a first switch 43, a second switch 44, a rotary knob 45 and an indicating lamp 46. The controller 41 is electrically connected with the display 42, the first switch 43, the second switch 44, the rotary knob 45 and the indicating lamp 46 and contains a surveillance module 411 and a memory module 412.

The sensing unit 50 is disposed at one side of the side plate 12, corresponding to the bottom plate 11, composed of a positioning rod 51, a positioning frame 52 and a sensor 53. The positioning rod 51 is secured with the side plate 12, and the positioning frame 52 has one end combined with the positioning rod 51 by a second positioning member 54 and another end firmly fixed with the sensor 53, which is provided in a direction toward the bending portion 312 of the guide plate 31 and which is electrically connected with the control unit 40. The second positioning member 54 is a screw.

Figure 5:
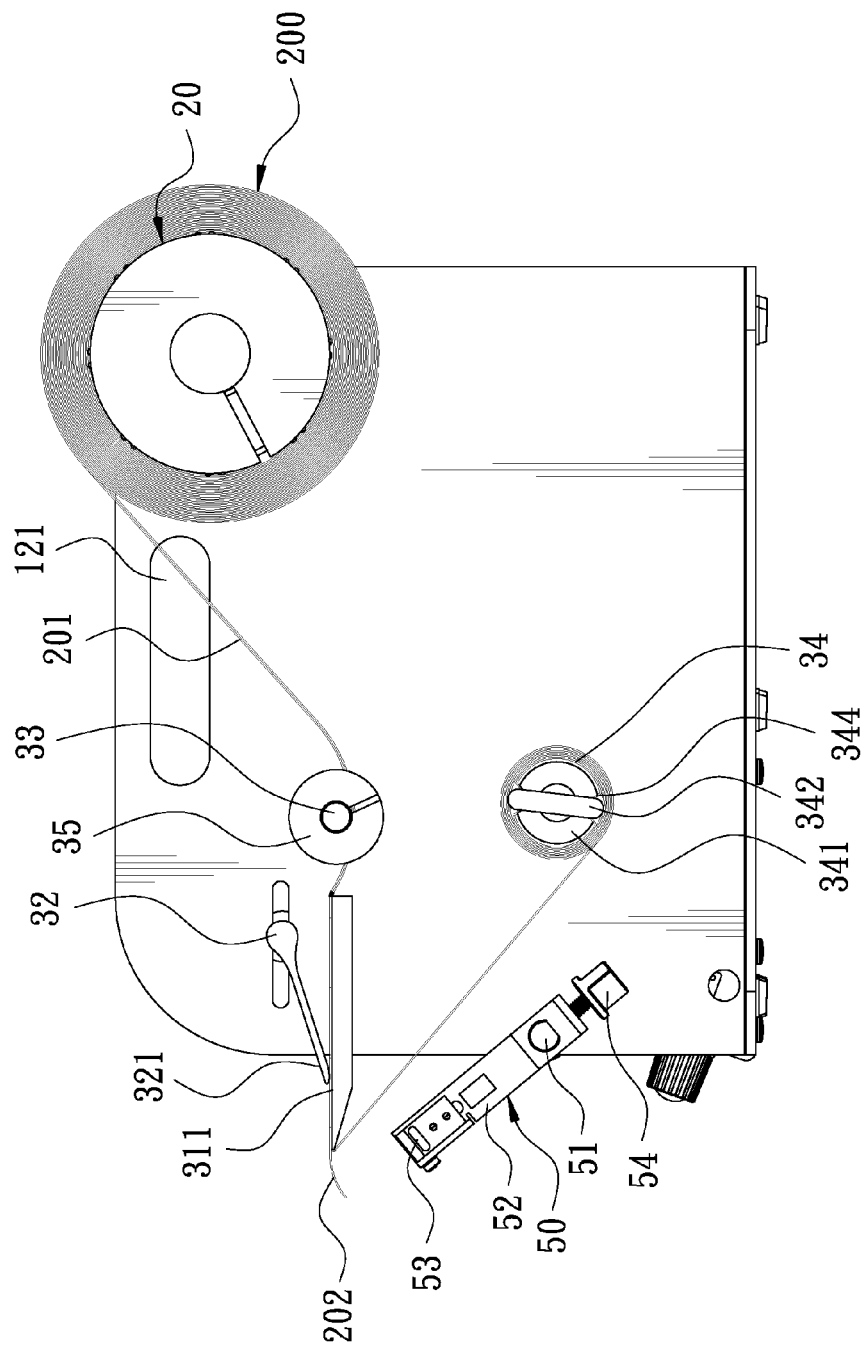
FIG. 5 is a schematic view of the automatic label stripping machine in a using condition in the present invention.

Referring to FIG. 5, to employ the automatic label stripping machine 100, firstly, have a label reel 200 fitted on the roller 21 and have the first stop member 22 restrained on both the roller 21 and the label reel 200 for fixing the label reel 200 in place. Next, pull out the label tape 201 to have the label tape 201 passing through the lower side of the guide stem 33 and through a place between the guide plate 31 and the press plate 32. After crossing over the bending portion 312 of the guide plate 31, the label tape 201 is pulled downward to pass through a place between the guide plate 31 and the sensing unit 50 and then wound around the winding shaft rod 34 and finally, the label tape 201 is fixed on the winding shaft rod 34 by the fixing member 342. Since the two fixing rods 345 are different in length; therefore, to install the fixing member 342, only need to have the longer fixing rod 345 firmly positioned in one fixing groove 344 first and the shorter fixing rod 345 can easily be inserted in another fixing groove 344, thus finishing installation of the label reel 200. Subsequently, the first switch 43 and the second switch 44 are turned on to start the automatic label stripping machine 100. At this time, the sensor 53 will carry out detection toward the direction of the bending portion 312 of the guide plate 31 to automatically detect the label 202 at the location of the bending portion 312 and then transmit signals to the control unit 40 for controlling the power member 343 to drive the winding shaft rod 34 to rotate or stop rotating. The design of the bending portion 312 enables the label tape 201 and the label 202 extending downward to be stripped naturally at the turning place of the front end edge 322 of the press plate 32, letting one end of the label 202 suspended in midair to facilitate the sensor 53 to detect the label 202. Thus, a user can easily strip and employ the label 202 by means of the control unit 40 and the sensing unit 50, and the label reel 200 can be installed conveniently.

Figure 6:
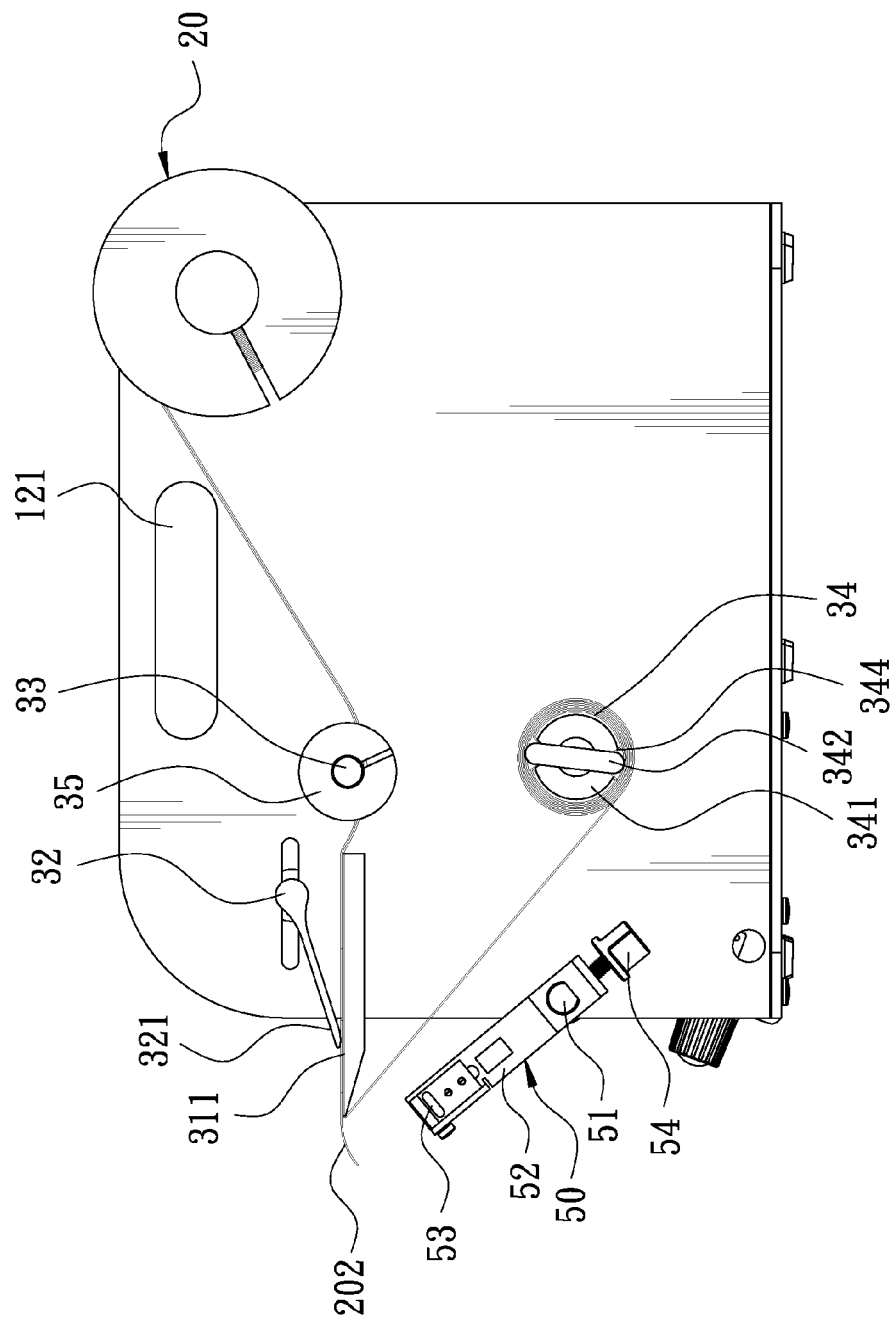
FIG. 6 is another schematic view of the automatic label stripping machine in another using condition in the present invention.

In installation of the label reel 200, various-typed and different-sized label reels 200 and labels 202 can be installed by means of the reel shaft rod 20, the rollers 21 and the first stop member 22, and the press plate 32 can be adjusted by the first positioning member 323 to regulate the pre-stress that the press portion 321 presses the application portion 311 of the guide plate 31 to enable the label tape 201 to be flatly attached to the application portion 311. Further, the guide plate 31 is formed with a large-area application portion 311 so a user to conveniently get the label 202 for use. The second positioning member 54 can be used for adjusting the location and the detecting method of the sensor 53 on the positioning rod 51 for facilitating installation of the label reel 200 and the label 202 of various types and different sizes. Referring to FIG. 6, the label reel 200 is blocked by the first stop member 22 that is cut with the radial insert slot 223, and a user can recognize inventory and flatness of the label tape 201 through the insert slot 223 and the insert slot 353.

To use the automatic label stripping machine 100, firstly, press the first switch 43 to start the automatic label stripping machine 100 and then press the second switch 44 to start the automatic label stripping machine 100 to make use of the control unit 40 to automatically strip the label 202. At this time, the indicating lamp 46 will give out green light to indicate a working condition, and the rotary knob 45 can be operated to control the rotating speed of the power member 343 for controlling stripping speed of the label 202 and showing the amount of the labels 202 already stripped on the display 42. The surveillance module 411 functions to monitor both the power member 343 and the sensor 53. When the power member 343 is under a condition of high load, for instance, the power member 343 impacts tooth, or the sensor 53 does not yet detect the label 202 within a certain time, an error will be shown on the display 42, while the memory module 412 will memorize the manufacturing date of the automatic label stripping machine 100 and the amount of labels 202 when the error occurs, which will be shown on the display 42 to be a basis of maintenance of the automatic label stripping machine 100.

When the label reel 200 has to be replaced, a user needs only to detach the fixing member 342 from the winding shaft rod 34 by holding the sealed end of the fixing member 342 and thus, the label tape 201 used can easily be removed. Afterward, another label reel 200 can be assembled for employing the automatic label stripping machine 100 again, and the label tape 201, which was used and wound on the winding shaft rod 34, can be replaced, convenient in using, removing and reclaiming the label tape 201.

To move the automatic label stripping machine 100, simply have a hand inserted through the transverse slot 121 to lift and move the automatic label stripping machine 100. Since the reel shaft rod 20, the label stripping unit 30, and the sensing unit 50 and the control unit 40 are respectively provided at two sides of the side plate 12; therefore, weight imposed at two sides of the side plate 12 is balanced and hence, the automatic label stripping machine 100 can conveniently be carried.

One special feature of this invention is that the members of the automatic label stripping machine 100 and the control unit 40 are modular; therefore, when a single member or part is damaged or causes trouble, it needs only to replace one single member or part, thus convenient in maintenance of the automatic label stripping machine 100.

While the preferred embodiment of his invention has been described above, it will be recognized and understood that various modifications may be made therein and the appended claims are intended to cover all such modifications that may fall within the spirit and scope of the invention.

What is claimed is:

1. An automatic label stripping machine comprising:
a base, said base formed with a bottom plate, said bottom plate having one side extending upward to form a side plate that is perpendicular to said bottom plate;
a reel shaft rod, said reel shaft rod provided at one side of said side plate, corresponding in position to said bottom plate, said reel shaft rod fitted on said side plate, said reel shaft rod fitted with at least one roller, said roller of said reel shaft rod having an outer side mounted with a first stop member;
a label stripping unit, said label stripping unit horizontally assembled at one side of said side plate, corresponding in position to said bottom plate, said label stripping unit composed of a guide plate, a press plate, a guide stem and a winding shaft rod, said guide plate being rectangular, said guide plate formed with an application portion, said guide plate having a front end bent to form a bending portion with an internal angle less than 90 degrees, said bending portion protruding from said side plate, said press plate positioned above said guide plate, said press plate being a rectangular plate, said press plate having a front end bent and formed with a press portion with an internal angle less than 90 degrees, said press portion of said press plate formed with a curved front end edge, said press plate slanting to a direction of said application portion of said guide plate, said press portion able to press said application portion, said guide stem set between said guide plate and said reel shaft rod, said reel shaft rod composed of a main body, a fixing member and a power member, said winding shaft rod having a toroidal surface radially recessed with at least two fixing grooves, said fixing member being U-shaped, said fixing member provided with two fixing rods corresponding in position with two said fixing grooves, said winding shaft rod connected with said power member;
a control unit, said control unit installed at one side of said side plate, which is opposite to said bottom plate, said control unit electrically connected with said power member; and
a sensing unit, said sensing unit assembled at one side of said side plate, corresponding in position to said bottom plate, said sensing unit composed of a positioning rod, a positioning frame and a sensor, said portioning rod secured with said side plate, said positioning rod secured with said side plate, said positioning rod having another end fixed with said sensor, said sensor positioned in a direction toward said bending portion of said guide plate, said sensor electrically connected with said control unit.

2. The automatic label stripping machine as claimed in claim 1, wherein said side plate is bored with a transverse slot and a positioning slot, which are parallel to said bottom plate.

3. The automatic label stripping machine as claimed in claim 1, wherein said first stop member is bored with an insert hole corresponding in position to said reel shaft rod and is radially extending outward to form a protruding ring, said first stop member further bored with a radial insert slot.

4. The automatic label stripping machine as claimed in claim 1, wherein said application portion is parallel to said bottom plate.

5. The automatic label stripping machine as claimed in claim 1, wherein said press plate has a rear end assembled with said positioning slot by said first positioning member.

6. The automatic label stripping machine as claimed in claim 1, wherein said guide stem is mounted with a second stop member, said second stop member bored with an insert hole corresponding in position to said guide stem, said second stop member stretching outward radially to form a protruding ring, said second stop member cut with a radial insert slot.

7. The automatic label stripping machine as claimed in claim 1, wherein said two fixing rods are different in length.

8. The automatic label stripping machine as claimed in claim 1, wherein said control unit is composed of a controller, a display, a first switch, a second switch, a rotary knob and an indicating lamp, said first switch, said second switch, and said rotary knob and said indicating lamp, said controller containing a surveillance module and a memory module.

9. The automatic label stripping machine as claimed in claim 1, wherein said positioning frame has one end fixed with said positioning rod by said second positioning member.

\* \* \* \* \*